United States Patent [19]
Kuwabara et al.

[11] Patent Number: 5,348,919
[45] Date of Patent: Sep. 20, 1994

[54] HIGH-PACKING SILICON NITRIDE POWDER AND METHOD FOR MAKING

[75] Inventors: Haruyoshi Kuwabara; Akio Otsuka, both of Gunma; Yasuyuki Maki; Meguru Kashida, both of Annaka, all of Japan

[73] Assignee: Shin-Etsu Chemical Co., Ltd., Tokyo, Japan

[21] Appl. No.: 77,425

[22] Filed: Jun. 15, 1993

[30] Foreign Application Priority Data

Jul. 14, 1992 [JP] Japan .................................. 4-209562

[51] Int. Cl.$^5$ .......................................... C04B 35/58
[52] U.S. Cl. ...................................... 501/97; 501/94; 501/96; 501/154; 423/344; 423/349; 423/409
[58] Field of Search ..................... 501/94, 96, 97, 154; 264/65; 423/324, 344, 349, 351, 353, 385, 406, 409

[56] References Cited

U.S. PATENT DOCUMENTS

| | | | |
|---|---|---|---|
| 4,440,707 | 4/1984 | Shimamori et al. | 264/65 |
| 4,517,168 | 5/1985 | Kawahito et al. | 423/344 |
| 4,521,358 | 6/1985 | Miura et al. | 264/65 |
| 4,716,133 | 12/1987 | Horiuchi et al. | 501/97 |
| 4,923,829 | 5/1990 | Yasutomi et al. | 501/97 |
| 4,970,057 | 11/1990 | Wilkens et al. | 423/344 |

OTHER PUBLICATIONS

Derwent Publications Ltd. AN 93-121039 and JP A 5 058 606, (1993).
Derwent Publications Ltd. AN 88-238054 and JP A 63 170 203, (1988).
Derwent Publications Ltd. AN 91-326188 and DD-A 290 860 (1991).

Primary Examiner—Mark L. Bell
Attorney, Agent, or Firm—McAulay Fisher Nissen Goldberg & Kiel

[57] ABSTRACT

High-packing silicon nitride powder is prepared by reacting metallic silicon powder having a mean particle size of 1 to 10 μm and a purity of at least 99% directly with nitrogen for forming silicon nitride powder, milling the silicon nitride powder in a dry attritor until the tap density exceeds 0.9 g/cm$^3$ and the content of particles having an aspect ratio of up to 3 exceeds 95% by weight, and further milling the silicon nitride powder in a wet attritor for finely dividing coarse particles having a particle size of at least 2 μm. The silicon nitride powder has a tap density of at least 0.9 g/cm$^3$ and a mean particle size of 0.4 to 0.6 μm and contains at least 95% by weight of particles having an aspect ratio of up to 3 and up to 5% by weight of coarse particles having a particle size of at least 2 μm. The powder is moldable into a high density compact, from which a sintered part having improved dimensional precision and strength is obtained.

3 Claims, 1 Drawing Sheet

HIGH-PACKING SILICON NITRIDE POWDER AND METHOD FOR MAKING

CROSS-REFERENCE TO THE RELATED APPLICATION

Reference is made to the copending application Ser. No. 07/852,559 filed on Mar. 17, 1992, now abandoned by Haruyoshi KUWABARA, Akio OTSUKA and Meguru KASHIDA for "High-Packing Silicon Nitride Powder and Method for Making", which is assigned to the same assignee as the present invention.

BACKGROUND OF THE INVENTION

1. Field of the Invention

This invention relates to a silicon nitride powder having a high packing density and consisting of the majority of isometric particles and a minimized content of coarse particles so that a high density compact can be molded from the powder and a high strength body can be sintered from the compact, and a method for preparing the same.

2. Prior Art

Recently, silicon nitride draws attention because of its heat resistance, strength, and corrosion resistance. End products were generally produced by adding an organic binder to silicon nitride powder and oxide co-agent in powder form and dispersing the mix in a suitable medium, typically water to form a slurry. Compacts of desired shape are formed from the slurry either by granulating the slurry and compression molding the granules or by directly casting the slurry in a mold. The compacts are heated for burning out the binder and then sintered.

It is known that the slurry formed midway the process should have a high concentration and a low viscosity in order to obtain end products having satisfactory physical properties. With respect to the shaping stage prior to sintering, if the molded compact were increased in density, it would have increased density and reduced shrinkage upon sintering, which is advantageous in the strength and dimensional precision of sintered bodies.

Silicon nitride powder is conventionally prepared by silica reduction, imide decomposition or direct nitriding of metallic silicon powder. It was difficult to prepare a high concentration, low viscosity slurry from the conventional silicon nitride powder using water as the medium. Then in molding compacts, it was difficult to increase the density of compacts. Further the presence of coarse particles prevented the compacts from being sintered to high strength.

SUMMARY OF THE INVENTION

Therefore, an object of the present invention is to provide a novel and improved silicon nitride powder having a high packing density in that it can be formed into a high concentration, low viscosity slurry, molded into a high density compact, and thus sintered into a product having improved strength and dimensional precision. Another object of the present invention is to provide a method for preparing such a high-packing silicon nitride powder.

The inventors have found that by forming a silicon nitride powder by the direct nitriding method, for example, by reacting a metallic silicon powder having a mean particle size of about 1 to 10 $\mu$m and a purity of at least 99% with nitrogen in a nitrogen atmosphere containing about 5 to 20% by volume of hydrogen at a temperature of about 1,350° to 1,450° C., comminuting the silicon nitride powder in a dry ball agitating mill, and further comminuting the silicon nitride powder in a wet ball agitating mill, optionally followed by acid treatment, there is obtained a high-packing silicon nitride powder containing at least 95% by weight of particles having an aspect ratio of up to 3 and a less proportion of coarse particles of more than 2 $\mu$m in size, substantially free of acicular particles, and having a tap density of at least 0.9 g/cm$^3$, a low viscosity, and a high purity, which are sufficient to increase the compact density as well as to increase the sintered strength.

Silicon nitride particles produced by the direct nitriding methods generally contain a substantial proportion of acicular (needle-shaped) particles which not only tend to induce pneumoconiosis, but can be a main cause for a lowering of tap density and compact density and an increase of slurry viscosity. One apparent approach is to remove acicular particles by classification, but is low in the yield of effective silicon nitride. Simple removal of acicular particles by classification does not ensure that the remaining silicon nitride powder be closely packed.

Investigating how the density of silicon nitride powder compacts is affected by the powder-forming reaction conditions and related to the packing density and aspect ratio of the powder, the inventors found that when silicon nitride powder including acicular particles as prepared by the direct nitriding method is milled by means of a dry agitating mill, for example, a dry attritor using balls as the tumbling medium, where the silicon nitride powder is dry comminuted while increasing the grinding ability as by controlling the powder charge, there is obtained a silicon nitride powder containing at least 95% by weight of particles having an aspect ratio of up to 3. The high content of low aspect ratio particles means that the content of acicular particles is substantially reduced so that a health problem is eliminated. Then substantially the entire amount of silicon nitride is recovered. In addition, the resultant silicon nitride powder has a high packing density. That is, there is obtained a high-packing silicon nitride powder having a tap density of at least 0.9 g/cm$^3$, which could not be conventionally achieved. This silicon nitride powder can be molded into a compact having a density as high as 1.70 g/cm$^3$ or more, which can, in turn, be fired into a sintered body having an increased density and improved dimensional precision. This is the subject matter of the above-referred patent application. The inventors found that the dry agitating mill was effective for eliminating acicular particles, but was difficult to finely divide coarse particles because of its inherent milling mechanism, with the remaining coarse particles leading to some lowering of the strength of sintered bodies.

Continuing investigation efforts to solve this problem, the inventors have found that by further milling the dry milled powder in a wet agitating mill, especially a wet agitating mill using balls as the tumbling medium, the coarse particles are cut off. The wet milled powder can form a low viscosity slurry, contributing to great improvements in strength and other physical properties of sintered bodies.

Therefore, according to the present invention, there is provided a high-packing silicon nitride powder having a tap density of at least about 0.9 g/cm$^3$ and a mean particle size of 0.4 to 0.6 $\mu$m. The powder contains at least 95% by weight of particles having an aspect ratio of up to 3 and up to 5% by weight of coarse particles having a particle size of at least 2 μm. It is to be noted that the tap density is measured by charging a cylindrical metal container of 100 cm$^3$ volume with powder, repeating gravity drops from a height of 2 cm 180 times, and measuring the bulk density of the powder.

The present invention also provides a method for preparing such a high-packing silicon nitride powder, comprising the steps of: forming silicon nitride powder from metallic silicon powder having a mean particle size of 1 to 10 μm and a purity of at least 99% by weight by a direct nitriding method, milling the powder in a dry agitating mill until the tap density reaches or exceeds 0.9 g/cm$^3$ and the content of particles having an aspect ratio of up to 3 reaches or exceeds 95% by weight, and further milling the powder in a wet agitating mill for finely dividing coarse particles having a particle size of at least 2 μm.

DESCRIPTION OF THE PREFERRED EMBODIMENTS

Figure 1:
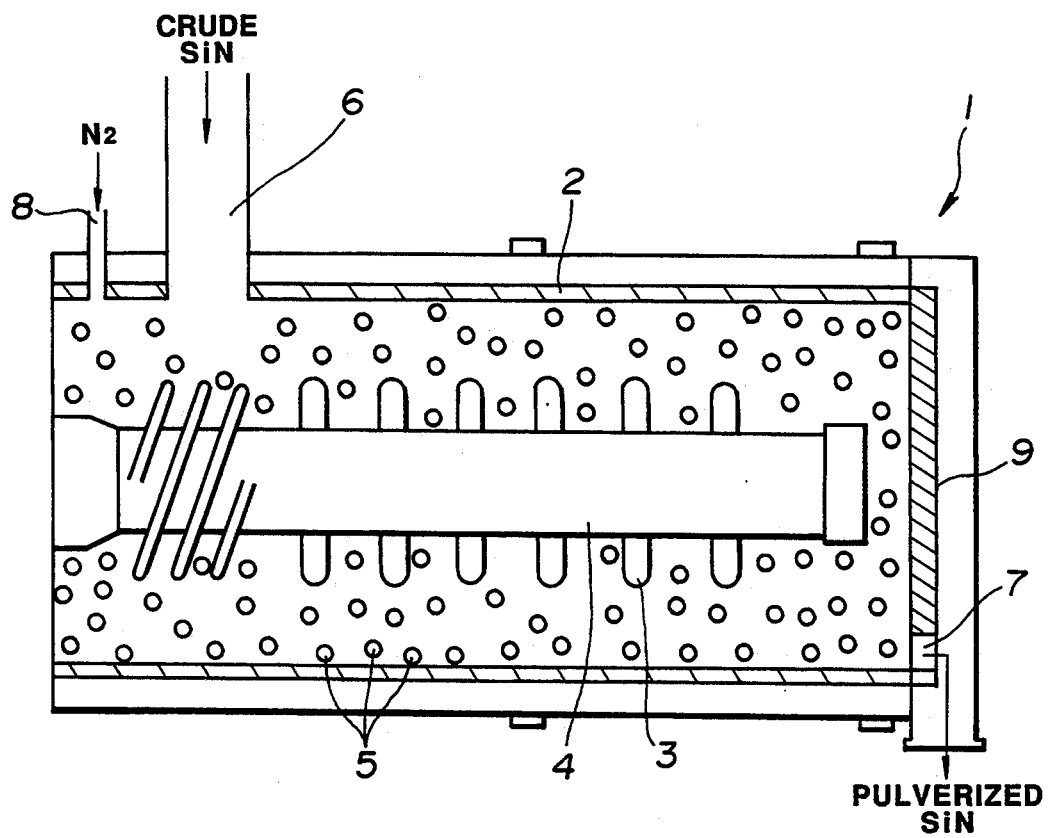
FIG. 1 is a schematic cross-sectional view of an exemplary dry attritor used in the method of the present invention.

The high-packing silicon nitride powder of the present invention should have a tap density of at least 0.9 g/cm$^3$, preferably at least 1.0 g/cm$^3$ and a mean particle size of 0.4 to 0.6 μm. The powder contains at least about 95% by weight of particles having an aspect (length-to-breadth) ratio of up to 3 and up to 5% by weight of coarse particles having a particle size of at least 2 μm. Outside the above-defined tap density and fine and coarse particle contents, one or more of the slurry viscosity, compact density, and sintered strength become insufficient to achieve the objects of the invention. A mean particle size of less than 0.4 μm rather increases the slurry viscosity because of a too much content of finer particles whereas a mean particle size of more than 0.6 μm adversely affects sinterability.

Also the silicon nitride powder preferably has a BET specific surface area of at least about 12 to 15 m$^2$/g because sinterability would be rather low with a specific surface area of less than 12 m$^2$/g. Beyond 15 m$^2$/g, a slurry would become too viscous prior to molding of compacts. Further preferably, the silicon nitride powder contains up to 1%, especially up to 0.8% by weight of oxygen. Additionally, the silicon nitride powder preferably contains up to 0.2%, especially up to 0.1% by weight of carbon. The total of metal impurities other than carbon, for example, iron, aluminum, and calcium should preferably be up to 0.1%, especially up to 0.08% by weight. The oxygen, carbon, and metal impurity contents are so limited because beyond the limits, finally sintered parts would be low in strength, especially at high temperature.

The silicon nitride base material from which the high-packing silicon nitride powder is obtained is not particularly limited although silicon nitride resulting from a direct nitriding method is often used. The end silicon nitride powder is produced by milling any appropriate silicon nitride base material in a dry agitating mill using balls as tumbling medium and further milling the powder in a wet agitating mill using balls as tumbling medium. The direct nitriding method used herein is not particularly limited and any conventional one is useful. In order that the final silicon nitride powder have higher packing nature and strength, it is preferred to prepare high-purity silicon nitride base material by the following method.

The source material is metallic silicon powder preferably having a mean particle size of about 1 to 10 μm and a purity of at least about 99%, more preferably a BET specific surface area of about 1 to 5 m$^2$/g. Powder having a mean particle size of less than 1 μm is expensive and difficult to handle whereas powder having a mean particle size in excess of 10 μm would be less reactive, leaving a larger proportion of the powder unreacted. Powder having a BET specific surface area of less than 1 m$^2$/g would be less reactive, leaving a larger proportion of the powder unreacted whereas powder having a BET specific surface area of more than 5 m$^2$/g is too expensive and can be increased in oxygen content. A purity of less than 99% would result in a sintered body of low purity.

The metallic silicon powder is nitrided. Nitriding reaction can be effected by any conventional well-known direct nitriding method. Typical nitriding conditions include a temperature of about 1,350° to 1,450° C. and a time of about 1 to 5 hours. The reaction atmosphere is preferably a stream of a gas mixture of nitrogen and hydrogen, especially a mixture of nitrogen and hydrogen in a volume ratio of from about 5/95 to 20/80. The pressure preferably ranges from about 10 to 100 mmAq during reaction. The reaction furnace is generally a tunnel type pusher furnace or box type furnace although it is not limited thereto.

Nitriding reaction yields silicon nitride which is first crushed by means of a jaw crusher or the like, and then pulverized by an air cyclone mill (ACM) or roller mill into a crude powder. This pulverized silicon nitride generally has a tap density of less than about 0.9 g/cm$^3$, contains less than about 50% by weight of particles having an aspect ratio of up to 3 and about 10 to 50% by weight of acicular particles, and includes about 0.1to 0.5% by weight of iron, carbon, calcium, aluminum and other impurities. Such crude silicon nitride could be molded into a compact having a relatively low density of about 1.60 to 1.69 g/cm$^3$.

The silicon nitride powder of the present invention is obtained by comminuting the crude silicon nitride powder containing acicular particles by means of a dry agitating mill and further comminuting the powder by means of a wet agitating mill. The dry agitating mills used herein include media-agitating mills such as roller mills and ball mills, jet mills, and compression grinding mills. Preferred mills capable of milling the powder so as to eliminate acicular particles are dry agitating mills using balls as tumbling media, for example, dry attritors. The dry attritor includes a fixed milling shell which is charged with small-diameter balls and a powder to be milled whereby the contents are forcedly agitated by means of agitating rods or rotating disks for comminution. One exemplary structure of the dry attritor is illustrated in FIG. 1.

The dry attritor 1 includes a horizontal cylindrical milling shell 2 charged with tumbling media in the form of balls 5, and a rotating arm 4 having a plurality of agitating rods for axially agitating the tumbling media 5. The arm 4 is rotatably received in the shell 2 for forcedly tumbling the balls 5. The crude silicon nitride powder is admitted into the shell 2 through an inlet port 6 at one end of the shell 2 where it is comminuted by means of the balls 5 and finally discharged out of the shell 2 through an outlet port 7 at the opposite end of the shell. The shell 2 is further provided with a nitrogen inlet 8 near the inlet port 6 for passing nitrogen gas through the shell, if necessary. The shell 2 near the outlet 7 is provided with a screen 9. Although a horizontal continuous attritor is illustrated, the dry attritor may be vertical or batchwise. The balls used as the milling medium are hard, wear resistant, heat resistant ones made of metal or ceramic material, for example, balls of iron and silicon nitride.

The crude powder can be milled into a silicon nitride powder within the scope of the invention by means of a dry attritor while increasing its milling capability by supplying a powder charge equal to ½ to ¼ of the effective attritor capacity, for example, by setting a weight ratio of ball weight to powder charge of from 2/1 to 9/1 for silicon nitride balls. The milling time is generally about 5 minutes to about 5 hours per kg of silicon nitride powder.

The thus obtained silicon nitride powder is substantially free of acicular particles, has a tap density of at least about 0.9 g/cm$^3$ and contains at least about 95% by weight of particles having an aspect ratio of up to about 3. This silicon nitride powder is of high packing nature. If particles having an aspect ratio of up to about 3 do not reach 95% by weight of the overall powder, the powder would have a tap density of less than 0.9 g/cm$^3$, contain a noticeable amount of acicular particles, and be compacted into a compact having a density of less than 1.70 g/cm$^3$. The silicon nitride powder preferably has a mean particle size of 0.5 to 1.0 $\mu$m as measured by means of a scanning electron microscope or a BET specific surface area of 9 to 11 m$^2$/g although accurate measurement thereof is difficult due to a measurement method and secondary agglomeration. The amount of coarse particles having a particle size of more than 2 $\mu$m in the dry milled powder may generally by 15% by weight or more.

The dry milled powder is then comminuted by a wet agitating mill. The purpose of wet milling is to cut off coarse particles which have not been milled by the dry milling or to finely divide coarse particles having a particle size of more than 2 $\mu$m. The wet agitating mill includes a fixed tank which is charged with a powder to be milled, small-diameter balls and a liquid medium, typically water whereby the contents are forcedly agitated by means of agitating rods for comminution. The dry milled powder or silicon nitride powder is introduced into the tank along with water whereby the powder is comminuted. The balls used as the milling medium are hard, wear resistant, heat resistant ones made of metal or ceramic material, for example, balls of iron and silicon nitride.

wet milling can be effected under any desired conditions. For example, when 40 kg of the dry milled SiN powder is used, the tank is charged with 1 ton of iron balls having a diameter of ¼ inches and 100 liters of water medium, and the arm is rotated at about 68 rpm for about 10 to 16 hours. The mills used herein include media-agitating mills.

At the end of double milling procedures, the powder may be subject to conventional chemical treatment, typically acid treatment for removing worn-out iron and impurities. The acids used herein include HF, HCl, and HNO$_3$. For a mixed acid of HF and HNO$_3$, acid treatment is carried out at about 60° to 80° C. for about 4 to 8 hours.

The thus obtained silicon nitride powder is formed into a slurry, molded into a compact and finally sintered in a conventional manner. The powder of the invention allows the slurry to have a high concentration and a low viscosity, which in turn, allows compacts to be shaped to high density, which contributes to improvements in strength and dimensional precision of sintered parts. There are obtained sintered silicon nitride parts of quality which can find use in a variety of applications.

The silicon nitride powder of the present invention can give a slurry having a lower viscosity.

Using a polyethylene pot of 1 liter volume charged with 100 nylon-coated iron balls of 15 mm in diameter, a slurry is prepared by admitting 225 g of silicon nitride powder, 12.5 g of Y$_2$O$_3$, 12.5 g of Al$_2$O$_3$, 2.5 g of a dispersant and 175 g of water into the pot, and mixing the contents at 110 rpm for 15 hours.

The thus obtained slurry has the following viscosity when measured by a Type B viscometer with rotor No. 3 at 60 rpm for 30 seconds.

Silicon nitride powder of the present invention: 200 to 700 cp.

Silicon nitride powder which is obtained by conducting only dry milling (not conducting wet milling ): 750 to 1000 cp.

Silicon nitride powder which is obtained by conducting only wet milling (not conducting dry milling): 2000 to 2500 cp.

EXAMPLE

Examples of the present invention are given below by way of illustration and not by way of limitation.

EXAMPLE AND COMPARATIVE EXAMPLE

The source material used was metallic silicon powder having a mean particle size of 5 $\mu$m, a BET specific surface area of 2.5 m$^2$/g, and a purity of 99.5%. It was placed in a pusher type reactor where nitriding reaction took place in an atmosphere of a hydrogen/nitrogen gas mixture containing 15% by volume of hydrogen gas at 1,380° C. for one hour. The resulting silicon nitride was crushed by a jaw crusher and pulverized by an air cyclone mill.

The pulverized silicon nitride (SIN) powder had an alpha silicon nitride content of 93% by weight, a BET specific surface area of 4.5 m$^2$/g, an oxygen content of 0.45% by weight, an aspect ratio 3 or less particle proportion of less than 50% by weight, an acicular particle proportion of 45% by weight, and a mean particle size of 20 $\mu$m.

Next, the powder was comminuted by a dry attritor as shown in FIG. 1 using silicon nitride balls (diameter 5 mm) as tumbling media. The milling capability was adjusted by varying the charge of silicon nitride powder to set a ball/powder charge weight ratio of 9 kg/kg-SiN so that the BET specific surface area might fall in the range of 9 to 11 m$^2$/g. A silicon nitride powder having a BET specific surface area of 10.9 m$^2$/g was obtained.

Into a batchwise wet agitating mill charged with 1 ton of iron balls having a diameter of ¼ inches and 100 liters of water medium, 40 kg of the dry milled powder was admitted. The arm was rotated at 68 rpm for 10 hours.

At the end of milling, a mixed acid containing 40 kg of 55% concentration hydrofluoric acid and 50 kg of 73% concentration nitric acid was added dropwise to the milled slurry over 1.5 hours. Agitation continued for 4 hours at 80° C. At the end of acid treatment, the powder in slurry form was washed with water by means of a shriver (manufactured by Kurita Industry K.K.) and they dried by a spray dryer, obtaining 31 kg of silicon nitride powder within the scope of the invention.

For comparison purposes, powder (A) was prepared by the same milling and acid treatment procedures as above except that only the dry milling was carried out with the wet milling omitted. Powder (B) was prepared by the same milling and acid treatment procedures as above except that only the wet milling was carried out for 16 hours with the dry milling omitted.

Each silicon nitride powder was measured for BET specific surface area, impurity contents (carbon and metal impurities), tap density, a proportion of aspect ratio 3 or less particles, and a proportion of acicular particles. The particle size distribution was measured by a laser diffraction technique to determine the mean particle size and the proportion of coarse particles of 2 $\mu$m or more in size. The powder was dispersed in water to form a slurry which was measured for viscosity, and then CIP molded under a pressure of 2,000 kg/cm$^2$ into a compact which was measured for density and dimensions.

The tap density was measured by means of a powder tester available from Hosokawa Iron Works K.K. by charging a cylindrical metal container of 100 cm$^3$ volume with the powder, repeating gravity drops from a height of 2 cm 180 times, leveling off extra powder above the top surface of the container by a blade, and measuring the weight of the container. The percentage of particles having an aspect ratio of up to 3 was determined by using a scanning electron microscope (SEM) photograph and sampling 1,000 particles. The percentage of acicular particles was also determined by using the SEM photograph and sampling 1,000 particles.

The slurry viscosity was measured as follows. Using a polyethylene pot of 1 liter volume charged with 100 nylon-coated iron balls of 15 mm in diameter, a slurry was prepared by admitting 250 grams of the powder, 175 grams of water and 1% based on the weight of the powder of a dispersant (A-30SL available from Toa Synthetic Chemical K.K.) into the pot, and mixing the contents at 106 rpm for 15 hours. The slurry viscosity was measured by a Type B viscometer manufactured by Tokyo Seiki K.K. with rotor No. 3 at 60 rpm for 30 seconds.

The sintered density and strength was measured by previously mixing 90 parts by weight of silicon nitride powder, 7 parts by weight of yttrium oxide and 3 parts by weight of aluminum oxide in hexane as a liquid medium, molding the mix into a compact, heating the compact in a nitrogen atmosphere at 1,780° C. for 4 hours, and machining the sintered body into a test specimen. Relative density was measured in accordance with JIS R-2205 and three-point bending strength in accordance with JIS R-1601 (an average of five samples being reported). The density of the compact was determined by measuring the dimensions of the compact by a slide gauge to determine the volume, weighing the compact and dividing the weight by the volume.

The results are shown in Table 1.

TABLE 1

|  | Example | Comparative Example A | Comparative Example B |
|---|---|---|---|
| Mean particle size, $\mu$m | 0.54 | 0.69 | 0.65 |
| Particles $\geq$ 2 $\mu$m, wt % | 2.2 | 17.6 | 7.2 |
| BET surface area, m$^2$/g | 14.4 | 12.4 | 14.4 |
| Impurity, wt % |  |  |  |
| Oxygen | 0.66 | 0.55 | 0.62 |
| Carbon | 0.08 | 0.08 | 0.07 |
| Other metals | 0.09 | 0.08 | 0.09 |
| Tap density, g/cm$^3$ | 1.15 | 1.12 | 0.75 |
| Acicular particles, wt % | <1 | <1 | <20 |
| Particles with aspect ratio $\leq$ 3, wt % | >99 | >99 | >77 |
| Compact density, g/cm$^3$ | 1.82 | 1.89 | 1.68 |
| Slurry viscosity, centipoise | 380 | 760 | 2050 |
| Sintered density, g/cm$^3$ | 3.19 | 3.17 | 3.19 |
| Bending strength, kg/mm$^2$ | 95 | 75 | 85 |

The silicon nitride powder of the invention can be formed into a slurry of high concentration and low viscosity, molded into a compact of high density, and thus sintered into a part of improved strength and dimensional precision. The method of the invention insures easy preparation of such silicon nitride powder.

Although some preferred embodiments have been described, many modifications and variations may be made thereto in the light of the above teachings. It is therefore to be understood that within the scope of the appended claims, the invention may be practiced otherwise than as specifically described.

We claim:

1. A silicon nitride powder having a tap density of at least 0.9 g/cm$^3$ and a mean particle size of 0.4 to 0.6 $\mu$m, said powder containing at least 95% by weight of particles having an aspect ratio of up to 3 and up to 5% by weight of coarse particles having a particle size of at least 2 $\mu$m and having a BET specific surface area of 12 to 15 m$^2$/g.

2. A method for preparing silicon nitride powder having a tap density of at least 0.9 g/cm$^3$, a mean particle size of 0.4 to 0.6 $\mu$m and a BET specific surface area of 12–15 m$^2$/g comprising the steps of:

forming silicon nitride powder from metallic silicon powder having a mean particle size of 1 to 10 $\mu$m, a purity of at least 99% by weight and a BET specific surface area of 1 to 5 m$^2$/g by a direct nitriding method;

milling the silicon nitride powder in a dry agitating mill until the tap density reaches 0.9 c/cm$^3$ or more and the content of particles having an aspect ratio of up to 3 reaches 95% by weight or more; and further milling the silicon nitride powder in a wet agitating mill for finely dividing coarse particles having a particle size of at least 2/$\mu$m.

3. Silicon nitride powder formed by the method of claim 2, said silicon nitride powder having a tap density of at least 0.9 g/cm$^3$, a mean particle size of 0.4 to 0.6$\mu$m and a BET specific surface area of 12 to 15 m$^2$/g.

* * * * *